United States Patent [19]

DeWavrin et al.

[11] 3,957,081

[45] May 18, 1976

[54] MODIFIER

[75] Inventors: Daniel DeWavrin; Janusz Nitecki; Lionel Bourbotte, all of Paris, France

[73] Assignee: Etablissements P. Piel Societe Anonyme, France

[22] Filed: Jan. 16, 1974

[21] Appl. No.: 433,787

[52] U.S. Cl............................ 137/625.4; 137/625.42
[51] Int. Cl.².......................................... F16K 11/06
[58] Field of Search....... 137/625.17, 625.4, 625.42, 137/625.13

[56] References Cited
UNITED STATES PATENTS

| | | | |
|---|---|---|---|
| 2,503,881 | 4/1950 | Manis | 137/625.42 X |
| 2,601,966 | 7/1952 | Busick | 137/625.42 X |
| 3,543,799 | 12/1970 | Hayman | 137/625.17 X |
| 3,661,180 | 5/1972 | Lyon | 137/625.17 |
| 3,667,503 | 6/1972 | Farrell et al. | 137/625.4 |
| 3,747,638 | 7/1973 | Manoogian et al. | 137/625.4 |

*Primary Examiner*—Henry T. Klinksiek
*Attorney, Agent, or Firm*—Robert E. Burns; Emmanuel J. Lobato; Bruce L. Adams

[57] ABSTRACT

A mixing valve having one single control device by which the fluid output and the temperature of the fluid output are regulated independently. The valve has two plates, one slidable on the other, one plate having an orifice in fluid communication with the valve's outlet and the other plate having two orifices in fluid communication with the hot and cold inlets to the valve, respectively. The orifices are rectangular with longitudinal and transverse axes parallel, respectively. Two-way movement of a handle is transmitted to the said one plate causing it to slide on the other in two directions such that the overlap of the inlet orifices by the outlet orifice is altered. This regulates the rate of flow through the orifices and the ratio of hot and cold fluid in the main output.

5 Claims, 8 Drawing Figures

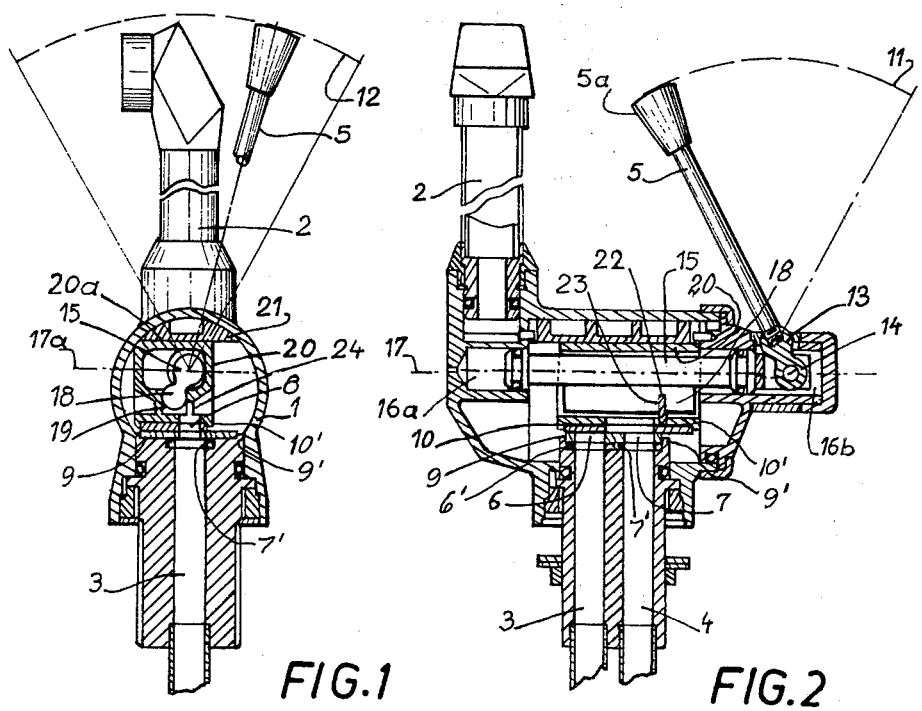
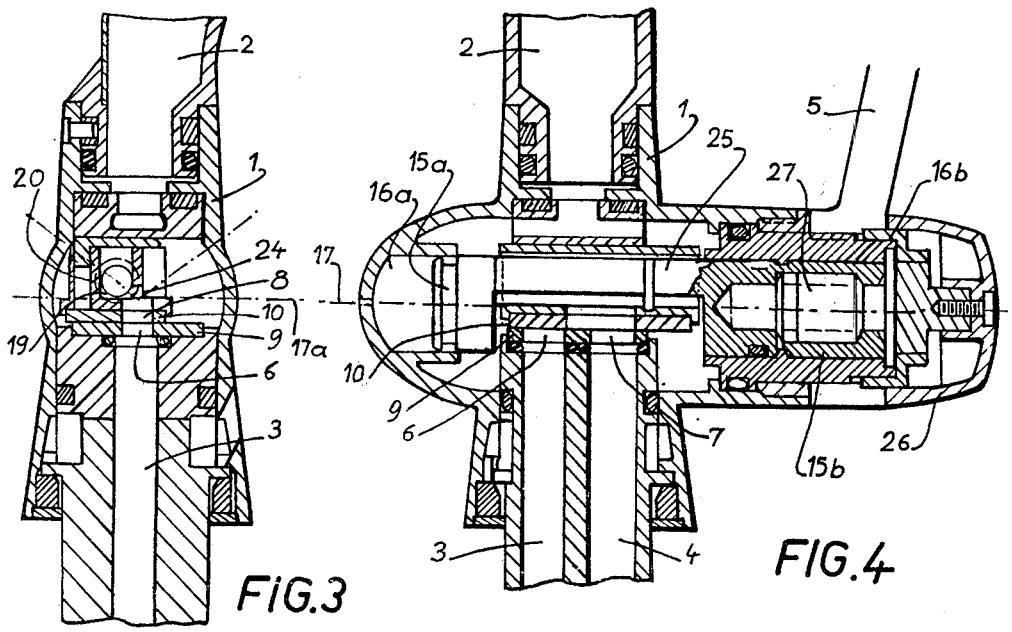

MODIFIER

BACKGROUND OF THE INVENTION

This invention relates to a single-handled mixing valve.

A known type of such a valve has two discs capable of sliding on each other and provided with orifices, one with inlet orifices and the other with an outlet orifice, the orifices being defined by curved surfaces calculated to ensure that a traversing or pivoting movement of one disc in relation to the other enables a constant ratio to be maintained between the areas of coincident orifice zones, and also enables the sum of the areas of the coincident zones to be kept constant. This first type suffers from the drawback of lack of precision, owing to the difficulty of constructing the orifices in a suitable manner.

In a second type there are two coaxial cylinders mounted one inside the other, one of the cylinders having the two inlet orifices and the other the outlet orifice. This second type, although attractive, presents major disadvantages. It is difficult to seal the orifices of the two cylinders from one another as required. If adequate sealing is achieved, the cylinders cannot be easily moved in relation to each other. Due to the lack of adequate clearance between them they tend to become jammed, particularly on expansion or scaling.

SUMMARY OF THE INVENTION

The purpose of the present invention is to provide a mixing valve which retains the respective advantages of the disc-type and cylinder type valves while avoiding their drawbacks.

According to the present invention there is provided a modifier, comprising: a body having two fluid inlets and fluid outlet, first and second plates located in said body in mutual overlying contact, said first plate having two inlet orifices each of rectangular shape and said second plate having a single outlet orifice of rectangular shape, opposed edges of said outlet orifice being parallel to and coplanar with opposed edges of each of said inlet orifices; and manually operated means for causing one of said plates to slide with respect to the other plate in two perpendicular directions, or in a combination of said directions, which are parallel to respective, mutually opposed edges of said orifices, so that the outlet orifice variably at least partially, overlaps at least one of the inlet orifices, whereby the rate of outlet delivery and the ratio between the two inlet deliveries is regulated.

BRIEF DESCRIPTION OF THE DRAWINGS

Embodiments of the invention will now be described by way of example, with reference to the accompanying drawings, in which:

FIG. 1 is a lateral section of a first embodiment of the invention;

FIG. 2 is a front sectional view of the first embodiment shown in FIG. 1;

FIG. 3 is a lateral section of a second embodiment of the invention;

FIG. 4 is a front sectional view of the second embodiment shown in FIG. 3; and

DESCRIPTION OF PREFERRED EMBODIMENTS

Figure 5:
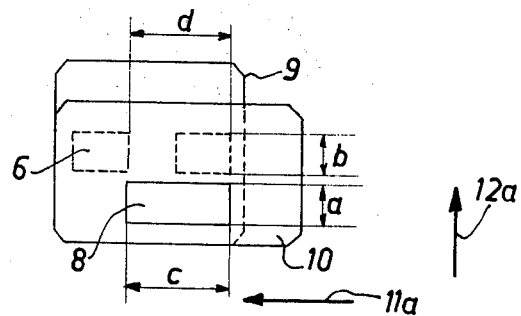
FIGS. 5, 6, 7 and 8 are schematic diagrams of a detail of the invention.

As shown in FIGS. 1 and 2, a mixing valve in accordance with the invention comprises a body 1 to which are connected on outlet pipe 2 and two inlet pipes, for hot water and cold water, marked 3 and 4 respectively. A handle 5, which can be moved in two directions 11 and 12, enables the outlet delivery and the ratio between the two inlet deliveries to be regulated independently.

The two inlet pipes 3 and 4 are in communication, respectively, with two inlet orifices 6 and 7. The outlet pipe 2 communicates with an outlet orifice 8. The inlet orifices 6 and 7 are provided in a first plate 9 and the outlet orifice 8 in a second plate 10. The two plates 9 and 10 are parallel and adjacent, being at least partly in mutual overlying contact.

As shown in FIGS. 5 to 8, the two inlet orifices 6 and 7 are of rectangular shape, with parallel and coplanar edges. The outlet orifice 8 is likewise of rectangular shape, with edges parallel to those of the two secondary orifices 6 and 7. The two plates 9 and 10 can slide in relation to each other, with moderate friction, for which purpose their contact surfaces are machined in order to provide properly seal the orifices, and particularly the inlet orifices 6 and 7 from one another by the surrounding and intermediate contact surfaces of the two plates 9 and 10. The total delivery and the temperature of the mixture of hot and cold water are regulated by sliding the two plates relative to one another in two mutually perpendicular directions, parallel respectively to the two pairs of edges of the orifices 6, 7 and 8 or in a combination or resultant of these directions.

A mechanical device connected to the handle 5 initiates the relative displacement of the two plates in the aforementioned directions when the said handle 5 is moved in the two directions 11 and 12. The handle 5 is articulated to the body 1 by a swivel joint 13 enabling the handle to move in both directions 11 and 12 and enabling said handle 5 to act as a lever of the first order. That end 14 of the handle 5 which is opposite to knob 5a is pivotably mounted on the end of a bar-like shaft 15. The shaft 15 is mounted so that it can pivot and slide in mutually aligned housings 16a and 16b respectively, provided in body. As shown in FIGS. 1 and 2, a displacement of the handle 5 in the direction marked 11 causes the shaft or bar 15 to slide along its own axis, while a displacement in the direction marked 12 causes it to pivot about this axis. This sliding and pivoting movement takes place on an axis 17 of body 1 parallel to the long edges of the rectangular orifices 6, 7 and 8.

A projection 18 of the bar 15 is situated longitudinally and parallel to the axis 17 and opposite the second plate 10. This projection 18, partly of cylindrical shape, engages a housing 19 provided for this purpose in a support 20, a relatively lower part of which encloses the second plate 10. The cylindrical shape of the projection 18 enables it to interact with the housing 19 when the handle 5 is moved in the direction marked 12. The support 20 surrounds the bar 15. The upper surface 20a of the support 20, parallel to the second plate 10, slides with moderate friction on a key 21 placed against the inside of body 1. The support 20 and the plate 10 enclosed by it thus slide between two guides, constituted by the plate 9 and the key 21. A slit 22 provided in the projection 18, perpendicularly to the axis 17, interacts with a corresponding key part 23 integral with the support 20, to enable the support 20 to be driven when the bar 15 is displaced by actuating the handle 5 in the direction marked 11. The support 20 has an orifice 24 opposite to the outlet orifice 8 for the evacuation of the mixture.

The plates 9 and 10 are preferably made of a ceramic material with a low expansion coefficient. To take into account the expansion differences between the plates 9 and 10 and their respective supports, the plates are assembled on the supports in the following manner.

Each plate 9 and 10 is engaged, on its surface contacting the corresponding support portion and mainly in the vicinity of 3/4 and 20 respectively, the longitudinally spaced ends of the plate, two housings 9', 10' projecting from the respective supports. One of these housings, 9', as shown in FIG. 1 is in fixed sliding contact with the respective plate 9, the housing being incorporated in valve body 1. The other housing 10 enables the length of the respective plate 10 in relation to the support 20 to be varied, owing to the difference in expansion.

The aforementioned sealing of orifices from one another, by the two plates 9 and 10, is assisted by the fact that the first plate 9 is caused to move towards the second plate 10 in accordance with the water pressure. The hot water and the cold water exert their pressure on a plate area surrounding each of the inlet orifices 6 and 7 and defined by the internal contours of fluid tight rings 6, 7 interposed between the plate 9 and each of the pipes 3 and 4. This enables the lower plate to be caused to float, only exerting slight pressure on the rings. The rings can be compressible, as usual, to prevent the jamming which might result from expansion undergone by the valve elements after the passage of hot water.

The invention will be understood more clearly from a description of its operation. When the handle 5 is moved in the direction marked 11 the end 14 articulated to the bar 15 causes the said bar to slide in the housings 16a and 16b in a direction parallel to the axis 17 and also, via the slit 22 and the part 23, causes the support 20 to perform a traversing movement parallel to the axis 17, the said axis 17 being parallel to the longitudinal edges of the orifices 6, 7 and 8, as noted above. The second plate 10 is displaced by its housing 10, on the first plate 9, in a direction parallel to the longitudinal edges of the said orifices. When the handle 5 is moved in the direction marked 12, the bar 15 is caused to pivot about the axis 17, and the support 20, via the projection 18 and the housing 19, is caused to perform a traversing movement parallel to an axis 17a, which is perpendicular to the axis 17. If a movement of the handle 5 in direction 11 and a movement in direction 12 are combined, this causes displacement of the second plate 10 in respect of the first plate 9, by a combination of two movements parallel respectively to the two directions of edges, of the orifices 6, 7 and 8.

FIGS. 5 to 8 provide schematic diagrams of the two plates 9 and 10 in particular positions. In the preferred embodiment the inlet orifices 6 and 7 are of the same length and width, their respective longitudinal edges being aligned. The width $a$ of the outlet orifice 8 is equal to the width $b$ of the inlet orifices 6 and 7. The length $c$ of the outlet orifice 8 is equal to the distance $d$ between the longitudinal edges of the inlet orifices. The first plate 9 being fixed to the body 1, the displacements of the handle in directions 11 and 12 set up a corresponding displacement of the second plate 10 in accordance with the arrows 11a and 12a respectively.

Figure 6:
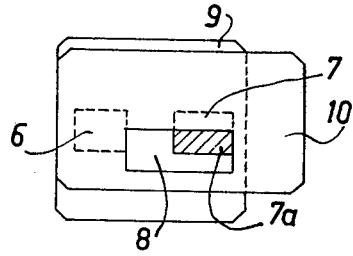
Figure 7:
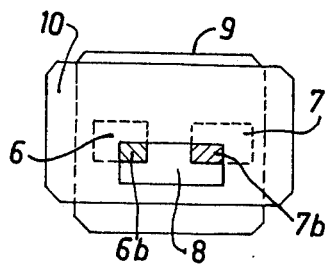
Figure 8:
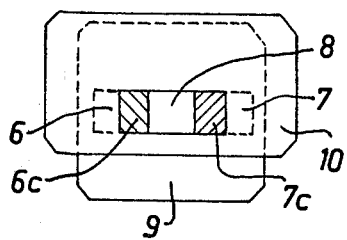

In the position shown in FIG. 5 the outlet orifice 8 does not overlap any part of the inlet orifices 6 and 7, and there is no delivery of liquid. The position shown in FIG. 5 is replaced by the position shown in FIG. 6, by causing the plate 10 to perform a traversing movement in the tranverse direction shown by the arrow 12a, which corresponds to an inception and gradual increase of delivery. The outlet orifice 8 then partially overlaps the inlet orifice 7 in the hatched zone 7a, which corresponds to a certain delivery of cold liquid. The position shown in FIG. 6 is replaced by that shown in FIG. 7 by moving the second plate 10 in the longitudinal direction indicated by the arrow 11a, corresponding to a variation of the temperature of the mixture with a constant rate of delivery. The outlet orifice 8 then partially overlaps the inlet orifices 6 and 7 in the hatched zones 6b and 7b. The sum of the areas of the zones 6b and 7b is equal to the area 7a, so that the delivery remains constant when the position shown in FIG. 6 is replaced by that shown in FIG. 7, i.e. when the handle 5 is moved in the direction 11. It will be noticed that the more the second plate 10 moves in the direction shown by the arrow 11a, the more the area of the zone 6b increases, that of the zone 7b decreases, and the hotter the mixture becomes. The position shown in FIG. 7 is replaced by that shown in FIG. 8 by moving the plate 10 further in the tranverse direction shown by the arrow 12a. The zones 6b and 7b of FIG. 7 are then transformed, becoming zones 6c and 7c, respectively, of FIG. 8. However, the ratio between the areas of the zones 6c and 7c remains equal to that between the areas of the zones 6b and 7b. In other words, the change over from the position shown in FIG. 7 to that shown in FIG. 8 and the movement of the handle 5 in direction 12 produces an increase in the total delivery, the temperature of the mixture remaining constant. Needless to say, the swivel joint 13 enables the user to obtain a movement corresponding to a combination of a movement of the handle 5 in the two directions 11 and 12.

FIGS. 3 and 4 show a second embodiment of the invention. This embodiment essentially consists of a variant of the transmission device for the movement of the plate 10 in relation to the plate 9. For greater convenience the devices already referred to and described in the preceding embodiment have been given the same reference numbers in this further version. It therefore comprises a body 1, pipes 2, 3 and 4, a first plate 9 with two orifices 6 and 7 and a second plate 10 with an orifice 8. There is also a handle 5. In this embodiment the bar 15 is partly hollowed out instead of possessing a projection 18. This provides a median cylindrical part 25 parallel to the axis 17, integral with the two ends 15a and 15b of the bar which are mounted so as to slide and rotate in the corresponding housings 16a and 16b of the body 1, eccentric in respect of the axis 17. The part 25 thus performs the same function as the projection 18, for which purpose it interacts with corresponding housing 19 provided in support 20 of the second plate 10. The interdependence of the part 25 and of the housing 19 enables the plate 10 to undergo a traversing movement on the axis 17. A device with a slit and groove perpendicular to the axis 17 and borne by the part 25 and by the support 20 enables the part 25 and the support 20 to be caused to slide parallel to the axis 17. The handle 5 is integral with the end 15b, which means that movement in the direction 12 is initiated by pivoting the handle about the axis 17, while sliding movement parallel to the axis 17 is obtained by means of a control knob 26 integral with a screw 27, improving the regulating action.

A number of advantages are provided by the use of a cylindrical part 25 instead of a projection 18. In the first place, the use of the part 25 reduces the space occupied by the transmission devices, so that the two plates 9 and 10 can be positioned at a lower level and the volume of the body 1 considerably reduced. Accordingly, the support 20 occupies less space and can be given a simpler shape, which reduces its cost and makes it easier to instal.

Needless to say, the invention, whatever embodiment thereof is adopted, possesses further characteristics which have always been normal in connection with taps and fittings, such as sealed joints. The invention may comprise numerous further improvements, which in no way form a departure from its principle, which is that of providing two plates capable of sliding in relation to each other and possessing rectangular orifices, with one single control device by which one of the plates can be moved in relation to the other in either of two perpendicular directions, parallel to the longitudinal and tranversal edges of the said orifices respectively. Needless to say, the body 1 may consist of a number of parts, and the dimensions shown for the plates 9 and 10 in the diagrams are not binding.

We claim:

1. A mixing valve comprising;
a valve body having two fluid inlets adjacent one another and having a fluid outlet opposite the inlets;
first and second flat plates located in the valve body in mutually overlying contact, both overlying said inlets and both located opposite said outlet, the first plate having two inlet orifices of rectangular shape extending through the plate in fluid communication with said fluid inlets respectively, one of said inlet orifices having edges aligned with edges of the other inlet orifice and spaced apart by a longitudinal distance, and the second plate having a single, elongate outlet orifice of rectangular shape extending through the plate in fluid connection with said fluid outlet and having longitudinal edges disposed longitudinally of the two inlet orifices, the outlet orifice being longer than either of the outlet orifices and being longer than said distance; and
a member mounted in the valve body for sliding and turning and for thereby moving and guiding said one plate to slide it longitudinally and transversally of the edges, while keeping corresponding edges of said orifices parallel to one another, to selectively establish and interrupt overlapping of the outlet orifice with one and with both of the inlet orifices.

2. A mixing valve according to claim 1 in which the inlet orifices have equal dimensions.

3. A mixing valve according to claim 2 in which a transversal edge of the outlet orifice has a length equal to that of a parallel corresponding edge of either inlet orifice.

4. A mixing valve according to claim 1 in which the first plate is fixed to the valve body, the second plate being movable in the valve body.

5. A mixing valve comprising;
a valve body having two fluid inlets adjacent one another and having a fluid outlet opposite the inlets;
first and second flat plates located in the valve body in mutually overlying contact, both overlying said inlets and both opposite said outlet, the first plate having two inlet orifices of rectangular shape extending through the plate in fluid communication with said fluid inlets respectively, one of said inlet orifices having edges aligned with edges of the other inlet orifice and spaced apart by a longitudinal distance, and the second plate having a single, elongate outlet orifice of rectangular shape extending through the plate in fluid connection with said fluid outlet and having longitudinal edges disposed longitudinally of the two inlet orifices, the outlet orifice being longer than either of the inlet orifices and being longer than said distance;
a handle;
universal bearing means in the valve body for connecting the handle to the valve body;
shaft means connected to the handle in the valve body for pivotal and axial movements of the shaft means by the handle; and
means connected with the shaft means for converting the pivotal and axial movements of the shaft means respectively into transverse and longitudinal sliding movements of the movable plate to selectively establish and interrupt overlapping of the outlet orifice with one and with both of the inlet orifices.

* * * * *